2,848,455
Patented Aug. 19, 1958

2,848,455

α-(P-AMINO-PHENYL)-α-LOWER ALKYL GLUTARIMIDES

Karl Hoffmann and Ernst Urech, Binningen, Switzerland, assignors to Ciba Pharmaceutical Products Inc., Summit, N. J.

No Drawing. Application July 10, 1956
Serial No. 596,838

Claims priority, application Switzerland July 18, 1955

6 Claims. (Cl. 260—281)

This invention relates to the manufacture of α-(p-amino-phenyl)-α-alkyl-glutarimides of the formula

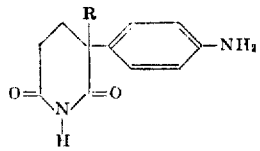

wherein R represents the methyl or ethyl radical, their salts, and derivatives thereof acylated at the amino group by a lower fatty acid. These new compounds possess valuable pharmacological properties and are intended for use as medicaments. In their effects they are distinguished in a surprising manner from the structurally similar α:α-disubstituted glutarimides.

The compound, α - phenyl - α - ethyl - glutarimide has proved to be of particular value and has been introduced into therapy under the scientific name Glutethimide as a mild hypnotic and sedative. The α-(p-amino-phenyl)-α-alkyl-glutarimides of the present invention, in contradistinction to compounds such as Glutethimide, surprisingly possess no sedative properties when administered in equal doses. On the contrary they exhibit pronounced anti-convulsive activity. In the case of the mouse for example, even in a dose as low as 25 mg./kg., protection is achieved against electric shock, whereas for the same effect a dose of 50 mg./kg. of Glutethimide is necessary. The properties of the new compounds are thus of very specific structural dependence. According to our experiments, α-(o-amino-phenyl)-α-ethyl-glutarimide for example has at the most one quarter of the activity of the p-amino compound. It is of particular importance that the new compounds, owing to the easy water solubility of their hydrochlorides, are also of parenteral application.

The α-(p-amino-phenyl)-α-alkyl-glutarimides of this invention are made by processes in themselves known, one of which consists in that in a compound of the formula

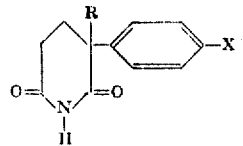

wherein R has the meaning given above, and X represents a substituent convertible into the amino group, the latter substituent is converted into such amino group and, if desired, from the resulting free base its salts are produced or the amino group correspondingly acylated. Substituents which are convertible into the amino group comprise especially such as can be converted thereinto by reduction or hydrolysis, for example, nitro-, nitroso-, acylated amino-, benzylamino- or methylene aminogroups. A preferred method is to reduce the nitro group with catalytically activated hydrogen.

A further process according to the invention consists in cyclizing α-(p-amino-phenyl)-α-alkyl-glutaric acid or its functional derivatives or derivatives thereof acylated at the amino group by a lower fatty acid to the glutarimide indicated above and, if desired, acylating the free amino group in resulting glutarimides with a lower fatty acid, or splitting off the acyl group in resulting p-acylamino compounds, and, if desired, converting any base obtained into a salt. This process can be carried out in such a manner that the corresponding substituted glutaric acids or their functional derivatives, such as their halides, are treated with ammonia.

The new compounds can also be obtained by the intramolecular acylation of a monoamide or one of its functional derivatives. In this case such an α-(p-aminophenyl)-α-alkyl-glutaric acid monoamide or one of its functional derivatives or an N-acyl compound can also be formed in the course of the reaction. Thus, for example, the corresponding substituted glutaric acid mononitriles, dinitriles or nitrile esters can be used as starting material and these treated in the presence or absence of solvents with condensing agents, such as concentrated sulfuric acid, acetic anhydride, tin tetrachloride, titanium chloride, boron trifluoride etherates, zinc chloride, aluminum chloride or mixtures thereof. Moreover, the diamide, diamonium salt or a mononitrile ammonium salt of the specified glutaric acids can be converted by heating into the new glutarimides. The starting materials required in the above processes can be prepared by known methods.

The α-alkyl-α-phenyl-glutarimides, for example, can be nitrated. The mixtures of o- and p-isomers resulting from such nitration can be separated by crystallization. However, the mixture may also be subjected to the process of this invention and the isomers separated when they have reached the stage of the end products.

The following examples illustrate the invention:

Example 1

26.2 grams of α-(p-nitro-phenyl)-α-ethyl-glutarimide of M. P. 137–139° C., dissolved in ethyl acetate, are reduced in the presence of nickel with hydrogen in a shaking flask at 50–70° C. until the absorption of hydrogen falls off. The catalyst is then filtered off with suction and the solution concentrated and cooled, as a result of which colorless crystals of M. P. 146–149° C. are obtained. Recrystallization from methanol gives pure α-(p-amino-phenyl)-α-ethyl-glutarimide of M. P. 149–150° C. (yield 97%).

Instead of ethyl acetate another solvent can be used in the above reduction, such as methanol or ethanol.

The hydrochloride of M. P. 223–225° C. is obtained by dissolving the base with alcohol and the corresponding quantity of hydrochloric acid gas in the hot with subsequent cooling of the solution. Colorless crystals are formed of M. P. 223–225° C., which are easily soluble in water.

The α-(p-nitro-phenyl)-α-ethyl-glutarimide of M. P. 137–139° C. can be prepared by various methods as follows:

(a) 217 grams of α-phenyl-α-ethyl-glutarimide are dissolved in 800 grams of concentrated sulfuric acid with subsequent cooling to about −10° C. and nitration is carried out at −10 to +10° C. by slow addition of a mixed acid consisting of 110 grams of concentrated sulfuric acid and 110 grams of 63% nitric acid. The nitration solution is stirred into ice, the separated nitro compound taken up in methylene or ethylene chloride, the solution washed with water and sodium carbonate solution until neutral and the solvent evaporated under vacuum. The residue is crystallized from methanol or ethyl acetate, whereby a yellowish crystal powder of M. P. 128–136° C. is obtained in a yield of about 85% which consists for the most part of α-(p-nitro-phenyl)-α-ethyl-glutarimide. By recrystallization from methanol the pure p-nitro-phenyl compound is obtained of M. P. 137–139° C. From the residues of the mother liquors a small quantity of the isomeric α-(o-nitrophenyl)-α-ethyl-glutarimide of M. P. 170–172° C. can be obtained.

(b) 250 grams of phenyl-ethyl-acetonitrile are run slowly at 5–20° C. with ice cooling into a mixture of 700 cc. of nitric acid (of specific gravity 1.42) and 700 cc. of concentrated sulfuric acid, the reaction is allowed to continue for one hour longer and the mixture is stirred into 3 kg. of ice. The separated oil is taken up in ether, the ether solution washed with water until neutral, dried and freed from solvent. The resulting oil is distilled under vacuum. After a small first running, the p-nitro-phenyl-ethyl-acetonitrile is obtained as a colorless oil of B. P. 158–160° C. under 0.3 mm. pressure in a yield of 80%.

95 grams of the resulting nitrile are dissolved in 150 cc. of dioxane and within one hour at 80–90° C. 52 grams of acrylic acid methyl ester and a little trimethyl-benzyl-ammonium hydroxide allowed to flow in. The mixture is maintained for a further hour at 90° C. The solvent is then distilled off under vacuum and the residue taken up in ether and ice water. After drying of the ether solution, the ether is distilled off and the remaining oil fractionated. The nitrophenyl-ethyl-glutaric acid mononitrile monomethyl ester of B. P. 184–186° C. under 0.05 mm. pressure results as an almost colorless oil which consists for the major part of the p-isomer. 75 grams of this nitrile ester are dissolved in 250 cc. of glacial acetic acid and 25 cc. of sulfuric acid (85% by weight) and the whole heated to boiling for 2 hours under a reflux condenser. The glacial acetic acid is now distilled off under vacuum, the residue poured on ice and the separated mass dissolved in ether or methylene chloride and the solution washed with water and sodium carbonate, dried and the solvent distilled off. The residue is recrystallized from ethyl acetate and the α-(p-nitrophenyl)-α-ethyl-glutarimide of M. P. 137–139° C. obtained. It is identical with the product obtained according to method (a).

*Example 2*

26.2 grams of crude α-(nitro-phenyl)-α-ethyl-glutarimide of melting point 118–130° C. is dissolved in ethyl acetate and reduced with water in an agitating flask at 50–60° C. in the presence of a palladium-charcoal catalyst until the combination of hydrogen subsides. The catalyst is then filtered off with suction and the filtrate concentrated to about 130 cc. While the filtrate cools, the α-(p-amino-phenyl)-α-ethyl-glutarimide of melting point 146–149° C. crystallizes. By recrystallization from ethyl acetate the pure product of melting point 149–150° C. is obtained. The o-compound remains in solution in the first mother liquor.

The crude α-(nitro-phenyl)-α-ethyl-glutarimide of melting point 118–130° C. used in this example is obtained by nitrating α-phenyl-α-ethyl-glutarimide according to paragraph (a) of Example 1, stirring the reaction solution into ice water, suction-filtering, and washing of the precipitated crystals.

*Example 3*

27.3 grams of α-(p-acetamino-ethyl)-α-ethyl-glutarimide of melting point 183–185° C. are heated in a reflux apparatus for 2 hours with 100 cc. of 18% hydrochloric acid, dissolution occurring. Part of the hydrochloric acid is then distilled off in vacuo. The remaining mass is introduced, while stirring, into a solution of sodium carbonate or potassium carbonate, the resulting crystals are filtered off with suction, washed well with water, and dried under reduced pressure at 50° C. On recrystallization from ethyl acetate pure α-(p-amino-phenyl)-α-ethyl-glutarimide of melting point 149–150° C. is obtained.

*Example 4*

A solution of 32.0 grams of α-(p-benzylaminophenyl)-α-ethyl-glutarimide in 640 cc. of alcohol is debenzylated with the aid of hydrogen in the presence of a palladium-charcoal catalyst in an agitating flask at 40–60° C. When the calculated quantity of hydrogen is taken up, the catalyst is filtered off, the solution evaporated, and the residue crystallized from ethyl acetate. There is obtained the α-(p-amino-phenyl)-α-ethyl-glutarimide in the form of colorless crystals melting at 149–150° C.

The α-(p-benzylamino-phenyl)-α-ethyl-glutaric acid imide of melting point 108–110° C. used as starting material is obtained by reducing the corresponding benzal compound.

Instead of the p-benzyl-amino compound the p-benzal compound can be used as starting material, the same end product being obtained.

*Example 5*

(Nitro-phenyl)-ethyl-glutaric acid-mononitrilemono-methyl-ester (prepared according to paragraph (b) in Example 1) is reduced under slightly superatmospheric pressure with catalytically activated hydrogen in ethyl acetate solution in the presence of palladium-charcoal or finely dispersed nickel at 20–45° C. There is obtained (amino-phenyl)-ethyl-glutaric acid-mononitrile-mono-methyl-ester in the form of a viscous pale-yellow oil.

24.6 grams of this compound are dissolved in 50 cc. of glacial acetic acid and 10.0 grams of sulfuric acid of 85 percent strength and heated for 2–4 hours at 95–105° C. with reflux cooling. The solution is then considerably concentrated under reduced pressure, the residue mixed with 100 cc. of water, and the solution introduced into a sodium carbonate solution, while stirring. During this operation, the reaction mixture must always remain alkaline. The base, which precipitates in crystalline form, is separated by filtration with suction, washed with water, dried, and recrystallized from ethyl acetate. There is obtained the pure α-(p-amino-phenyl)-α-ethyl-glutarimide of melting point 149–150° C.

*Example 6*

34.5 grams of α-(p-amino-phenyl)-α-ethyl-glutarimide are introduced into 70 cc. of acetic anhydride, complete dissolution occurring while the temperature rises to 50° C. The reaction mass is heated for a short while to 60° C. and then allowed to cool. The α-(p-acetamino-phenyl)-α-ethyl-glutarimide precipitates in pure state in the form of colorless crystals of melting point 183–185° C.

*Example 7*

24.8 grams of α-(p-nitro-phenyl)-α-methyl-glutarimide of melting point 176–180° C. are reduced with hydrogen in the presence of palladium charcoal in ethyl acetate or alcohol at 40–60° C. until the absorption of hydrogen subsides. The catalyst is then removed by filtering with suction and the solution concentrated and cooled, whereupon colorless crystals of melting point 138–140° C. are obtained in nearly quantitative yield. Recrystallization from ethanol gives pure α-(p-amino-phenyl)-α-methyl-glutarimide of melting point 144–146° C., which forms a readily water-soluble hydrochloride.

The α-(p-nitro-phenyl)-α-methyl-glutarimide of melting point 178–180° C. can be obtained by nitrating α-phenyl-α-methyl-glutarimide according to paragraph (a) of Example 1.

What is claimed is:
1. A compound selected from the group consisting of those having the general formula:

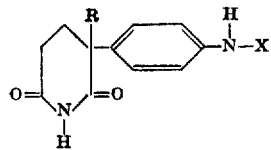

wherein R is a member selected from the group consisting of methyl and ethyl radicals and X is a hydrogen atom, and the salts thereof.

2. A coupound selected from the group consisting of those having the general formula:

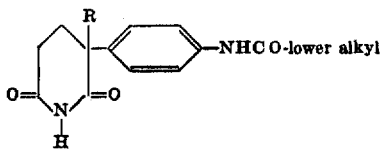

wherein R is a member selected from the group consisting of methyl and ethyl radicals and the salts thereof.

3. The new α-(p-amino-phenyl)-α-lower alkyl glutarimides.

4. The new compound α-(p-amino-phenyl)-α-ethyl-glutarimide.

5. The new compound α-(p-amino-phenyl)-α-methyl-glutarimide.

6. The new compound α-(p-acetylamino-phenyl)-α-ethyl-glutarimide.

References Cited in the file of this patent
UNITED STATES PATENTS 2,673,205  Hoffman, et al. _____ Mar. 23, 1954
2,749,346  Hoffmann, et al. _____ June 5, 1956

UNITED STATES PATENT OFFICE
CERTIFICATE OF CORRECTION

Patent No. 2,848,455                            August 19, 1958

Karl Hoffmann et al.

It is hereby certified that error appears in the printed specification of the above numbered patent requiring correction and that the said Letters Patent should read as corrected below.

Column 3, line 73, Example 3, for "-(p-acetamino-ethyl)-" read -- -(p-acetamino-phenyl)- --; column 5, line 14, for "coupound" read -- compound --.

Signed and sealed this 2nd day of December 1958.

(SEAL)
Attest:

KARL H. AXLINE                                                      ROBERT C. WATSON

Attesting Officer                                          Commissioner of Patents